(12) United States Patent
Walker (10) Patent No.: US 7,917,906 B2
(45) Date of Patent: Mar. 29, 2011

(54) RESOURCE ALLOCATION IN A COMPUTER-BASED SYSTEM

(75) Inventor: Michael D. Walker, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 1607 days.

(21) Appl. No.: 10/884,031

(22) Filed: Jul. 2, 2004

(65) Prior Publication Data

US 2006/0005196 A1    Jan. 5, 2006

(51) Int. Cl.
     *G06F 9/46*      (2006.01)
     *G06F 7/38*      (2006.01)

(52) U.S. Cl. .................... 718/104; 718/100; 712/223

(58) Field of Classification Search ............. 718/102, 718/104, 100; 710/108, 200, 267, 309; 712/223
See application file for complete search history.

(56) References Cited

U.S. PATENT DOCUMENTS

| | | | | |
|---|---|---|---|---|
| 3,905,018 A | * | 9/1975 | Gray ........................ | 382/308 |
| 4,378,590 A | * | 3/1983 | Kim ......................... | 718/104 |
| 4,425,615 A | | 1/1984 | Swenson et al. | |
| 4,604,694 A | * | 8/1986 | Hough ...................... | 710/200 |
| 4,725,946 A | * | 2/1988 | Prange et al. .............. | 718/106 |
| 4,807,111 A | * | 2/1989 | Cohen et al. ............... | 710/54 |
| 4,910,507 A | * | 3/1990 | Shimizu et al. ............. | 370/419 |
| 5,155,854 A | * | 10/1992 | Flynn et al. ................ | 718/104 |
| 5,265,257 A | * | 11/1993 | Simcoe et al. .............. | 710/263 |
| 5,274,809 A | * | 12/1993 | Iwasaki et al. ............. | 718/104 |
| 5,418,967 A | * | 5/1995 | Simcoe et al. .............. | 710/241 |
| 5,440,563 A | * | 8/1995 | Isidoro et al. .............. | 370/270 |
| 5,448,566 A | * | 9/1995 | Richter et al. .............. | 370/431 |
| 5,515,428 A | * | 5/1996 | Sestak et al. ............... | 379/266.01 |
| 5,530,742 A | * | 6/1996 | Taylor et al. ............... | 379/221.11 |
| 5,574,851 A | * | 11/1996 | Rathunde .................... | 714/7 |
| 5,630,130 A | * | 5/1997 | Perotto et al. .............. | 718/107 |
| 5,724,539 A | * | 3/1998 | Riggle et al. ............... | 711/100 |
| 5,867,736 A | | 2/1999 | Jantz | |
| 5,896,339 A | * | 4/1999 | McLaury ................... | 365/230.02 |

(Continued)

FOREIGN PATENT DOCUMENTS

EP      0777348 A2      6/1997

(Continued)

OTHER PUBLICATIONS

Publication ("AND gate"; Mar. 2004, p. 1-2).*

*Primary Examiner* — Meng-Ai An
*Assistant Examiner* — Caroline Arcos
(74) *Attorney, Agent, or Firm* — Fellers, Snider, et al.

(57) ABSTRACT

Method and apparatus for allocating system resources for use by software processes in a computer-based system, such as a wide area network (WAN) comprising a data storage array. A first memory space provides a first bit indicator to indicate whether at least one system resource is available for use. A second memory space provides a second bit indicator to indicate whether a pending software process awaits availability of the system resource. The resource is allocated for use by the process in relation to a combinatorial operation upon the first and second bit indicators, preferably comprising a logical AND operation. The first and second memory spaces are preferably characterized as multi-bit registers. A free resource stack identifies available resources, and a process queue identifies pending processes waiting for released processes. The statuses of the respective stack and queue are reflected in the bits in the multi-bit registers.

22 Claims, 5 Drawing Sheets

| gbl.free register 124 | 0 | 0 | 1 | 1 |
|---|---|---|---|---|
| gbl.waiter register 128 | 0 | 1 | 0 | 1 |
| AND | 0 | 0 | 0 | 1 |

U.S. PATENT DOCUMENTS

| | | | |
|---|---|---|---|
| 5,912,961 A * | 6/1999 | Taylor et al. | 379/221.11 |
| 6,058,473 A | 5/2000 | Guttag et al. | |
| 6,067,317 A * | 5/2000 | Fadavi-Ardekani et al. | 375/222 |
| 6,094,525 A | 7/2000 | Perlman et al. | |
| 6,115,788 A * | 9/2000 | Thowe | 711/114 |
| 6,134,630 A | 10/2000 | McDonald et al. | |
| 6,167,477 A * | 12/2000 | Garnett et al. | 710/306 |
| 6,167,558 A * | 12/2000 | Trimberger | 716/16 |
| 6,310,949 B1 * | 10/2001 | Taylor et al. | 379/219 |
| 6,314,099 B1 | 11/2001 | Fujisawa et al. | |
| 6,330,612 B1 * | 12/2001 | Boonie et al. | 709/229 |
| 6,349,345 B1 | 2/2002 | Sims, III et al. | |
| 6,427,171 B1 | 7/2002 | Craft et al. | |
| 6,549,978 B2 * | 4/2003 | Mansur et al. | 711/114 |
| 6,560,627 B1 * | 5/2003 | McDonald et al. | 718/103 |
| 6,581,135 B2 * | 6/2003 | Nakano et al. | 711/114 |
| 6,591,302 B2 | 7/2003 | Boucher et al. | |
| 6,697,868 B2 * | 2/2004 | Craft et al. | 709/230 |
| 6,697,881 B2 | 2/2004 | Cochran | |
| 6,732,231 B1 | 5/2004 | Don et al. | |
| 6,751,665 B2 | 6/2004 | Philbrick et al. | |
| 6,768,772 B2 | 7/2004 | Palm | |
| 6,772,256 B1 * | 8/2004 | Regev et al. | 710/240 |
| 6,829,765 B1 * | 12/2004 | Chan et al. | 718/104 |
| 6,966,061 B1 * | 11/2005 | Vance et al. | 718/100 |
| 6,988,185 B2 * | 1/2006 | Stark et al. | 712/214 |
| 7,039,915 B2 * | 5/2006 | Kavoori et al. | 718/104 |
| 7,051,242 B2 * | 5/2006 | Naffziger | 714/47 |
| 7,058,799 B2 * | 6/2006 | Johnson | 713/400 |
| 7,062,561 B1 * | 6/2006 | Reisman | 709/227 |
| 7,174,406 B1 * | 2/2007 | Abdallah et al. | 710/240 |
| 7,222,202 B2 * | 5/2007 | Sweet | 710/200 |
| 7,328,025 B2 * | 2/2008 | Jechoux | 455/452.1 |
| 7,444,634 B2 * | 10/2008 | Jeyaram | 718/104 |
| 7,475,089 B1 * | 1/2009 | Geddes | 707/102 |
| 2001/0034753 A1 * | 10/2001 | Hildebrand et al. | 709/107 |
| 2003/0074468 A1 | 4/2003 | Chang et al. | |
| 2003/0081612 A1 | 5/2003 | Goetzinger et al. | |
| 2004/0015874 A1 * | 1/2004 | Ungar | 717/127 |
| 2004/0049563 A1 * | 3/2004 | Orcutt et al. | 709/223 |
| 2005/0075915 A1 * | 4/2005 | Clarkson | 705/7 |
| 2005/0235319 A1 * | 10/2005 | Carpenter et al. | 725/52 |
| 2006/0053424 A1 * | 3/2006 | Koistinen et al. | 718/105 |
| 2008/0216082 A1 * | 9/2008 | Eilam et al. | 718/104 |

FOREIGN PATENT DOCUMENTS

| | | |
|---|---|---|
| EP | 0777348 A3 | 6/1997 |
| JP | 61-202232 | 9/1986 |
| JP | 04-092930 | 3/1992 |
| JP | 05-158783 | 6/1993 |
| JP | 10-301907 | 11/1998 |
| JP | 11-259319 | 9/1999 |
| JP | 2000-172515 | 6/2000 |
| JP | 2001-195269 | 7/2001 |

* cited by examiner

FREE RESOURCE STACK

FIG. 5

GLOBAL FREE REGISTER (RESOURCE TYPES 0-N)

FIG. 6

GLOBAL WAITER REGISTER (FOR RESOURCE TYPES 0-N)

| gbl.free register 124 | 0 | 0 | 1 | 1 |
| --- | --- | --- | --- | --- |
| gbl.waiter register 128 | 0 | 1 | 0 | 1 |
| AND | 0 | 0 | 0 | 1 |

RESOURCE ALLOCATION IN A COMPUTER-BASED SYSTEM

FIELD OF THE INVENTION

The claimed invention relates generally to the field of computer-based systems and more particularly, but not by way of limitation, to an apparatus and method for allocating system resources among a number of software processes.

BACKGROUND

Computer-based systems enable a wide variety of data processing tasks to be accomplished in a fast and efficient manner. From hand-held consumer products to geographically distributed wide area networks with multi-device data storage arrays, such systems continue to increasingly pervade all areas of society and commerce.

Software is provided to direct the operation of such systems. Software (including firmware) can take a number of forms such as application programs, operating systems, interface and controller routines, and maintenance and housekeeping modules, all of which tend to concurrently utilize and/or share system resources to carry out the various tasks at hand.

With the continued demand for ever increasing levels of complexity and functionality in computer-based systems, there remains a continual need for improvements in the manner in which system resources are allocated among various software processes.

SUMMARY OF THE INVENTION

Preferred embodiments of the present invention are generally directed to a method and an apparatus for allocating system resources for use by software processes in a computer-based system, such as a wide area network (WAN) comprising a data storage array.

In accordance with some preferred embodiments, the method preferably comprises steps of providing a first bit indicator to indicate whether at least one system resource is available for use and providing a second bit indicator to indicate whether a pending software process awaits availability of said system resource in order to carry out said process. The system resource is subsequently allocated for use by the software process in relation to a combination of the first and second bit indicators.

The first bit indicator is preferably characterized as a bit in a first multi-bit register, and the second bit indicator is preferably characterized as a bit in a second multi-bit register. The allocation preferably takes place through a combinatorial operation upon the first and second bit indicators, preferably comprising a logical AND operation.

Preferably, a free resource stack is provided to identify available resources, and a process queue is used to identify pending processes waiting for released processes. The statuses of the respective stack and queue are reflected in the bits in the multi-bit registers.

In accordance with further preferred embodiments, the apparatus preferably comprises a first memory space which stores a first bit indicator which indicates whether at least one system resource is available for use, and a second memory space which stores a second bit indicator which indicates whether a pending software process awaits availability of said system resource in order to carry out said process.

The apparatus further preferably comprises a control block which allocates said system resource for use by said process in relation to the first and second bit indicators. The control block preferably performs a combinatorial operation upon the first and second bit indicators, preferably comprising a logical AND operation.

As before, the first and second memory spaces preferably comprise respective multi-bit registers. A free resource stack formed in a third memory space preferably identifies each of a population of different types of system resources available for use, and the first bit indicator is set in relation to entry of said resource into said stack. A process queue formed in a fourth memory space preferably stores information associated with said process, wherein the second bit indicator is set in relation to entry of said information into the queue.

These and various other features and advantages which characterize the claimed invention will become apparent upon reading the following detailed description and upon reviewing the associated drawings.

DETAILED DESCRIPTION

Figure 1:
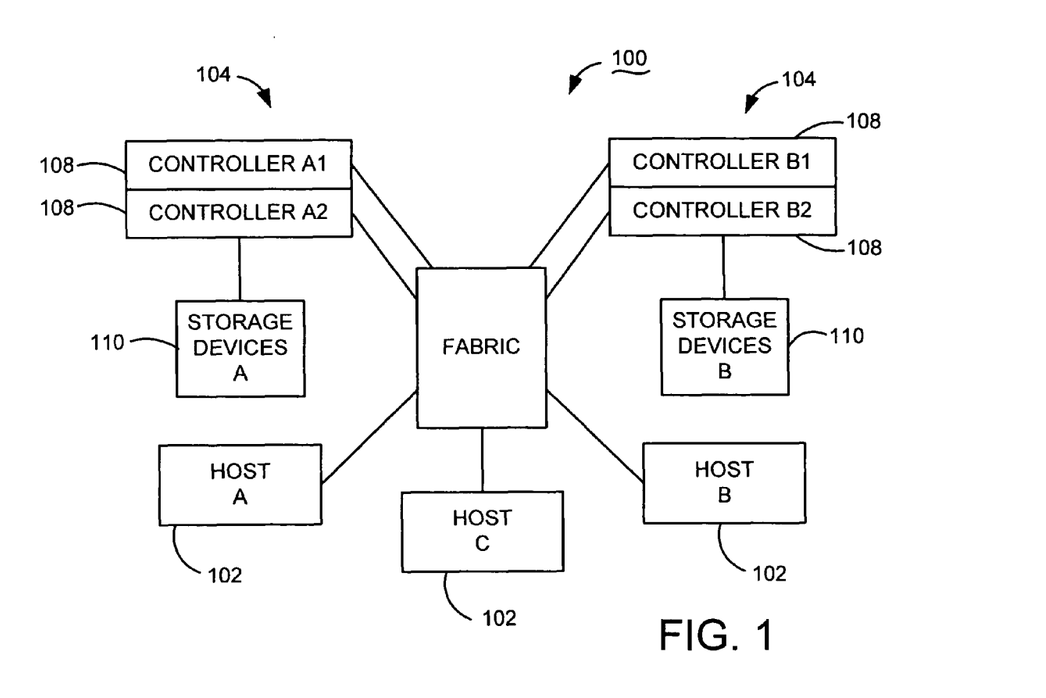
FIG. 1 is a top level functional block depiction of a computer-based system characterized as a wide-area network utilizing mass storage.

To illustrate an exemplary environment in which presently preferred embodiments of the present invention can be advantageously practiced, FIG. 1 shows a computer-based system 100 characterized as a wide area network (WAN) utilizing mass storage.

The system 100 includes a number of host computers 102, respectively identified as hosts A, B and C. The host computers 102 interact with each other as well as with a pair of data storage arrays 104 (denoted A and B, respectively) via a fabric 106. The fabric 106 is preferably characterized as a fibre-channel based switching network, although other configurations can be utilized as well including the Internet.

Each array 104 includes a pair of controllers 108 (denoted A1/A2 and B1, B2 respectively) and a set of data storage devices 110 preferably characterized as hard disc drives operated as a RAID (redundant array of independent discs). The controllers 108 and devices 110 preferably utilize a fault tolerant arrangement so that the various controllers 108 utilize parallel, redundant links and at least some of the user data stored by the system 100 is mirrored on both sets of devices 110.

It is further contemplated that the A host computer 102 and the A data storage array 104 are physically located at a first site, the B host computer 102 and B storage array 104 are physically located at a second site, and the C host computer 102 is at yet a third site, although such is merely illustrative and not limiting.

Figure 2:
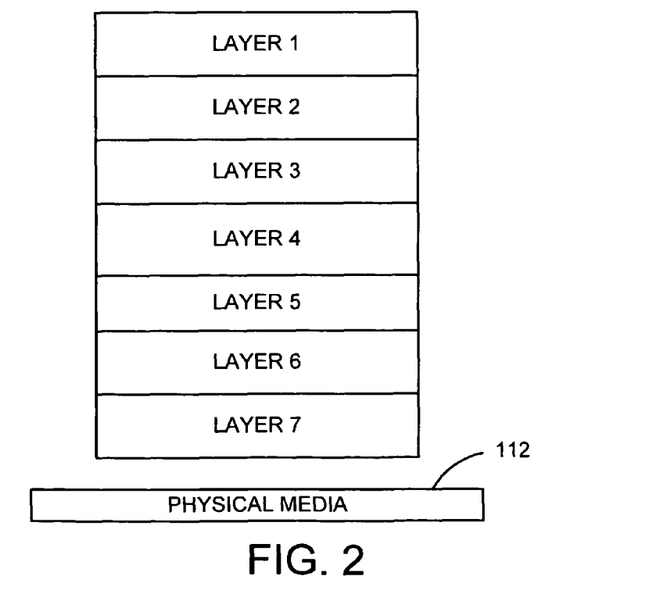
FIG. 2 generally represents a number of different software layers utilized by the system of FIG. 1.

FIG. 2 provides a generalized depiction of a preferred arrangement for software utilized by the system 100 of FIG. 1. In FIG. 2, the software is viewed as being arranged in a number of hierarchical layers (in this case Layer 1 through Layer 7), with Layer 1 representing a top-most layer in farthest proximity to physical media 112 of the devices 110, and Layer 7 representing a bottom-most layer most closely associated with the media 112.

While any number of arrangements can be utilized, for reference Layers 1-3 are contemplated as representing application routines and operating systems utilized by the host computers 102, Layers 4-5 represent routines and modules at the controller 108 level, and layers 6-7 represent routines and modules at the device 110 level.

As will be recognized, a data transfer request from a selected host computer 102 to write data to the devices 110 will invoke one or more host level command processes. Such processes in turn invoke various other processes down and back up through the various layers to ultimately result in the completion of the desired task. Along the way, various system resources are allocated, utilized and released.

Figure 3:
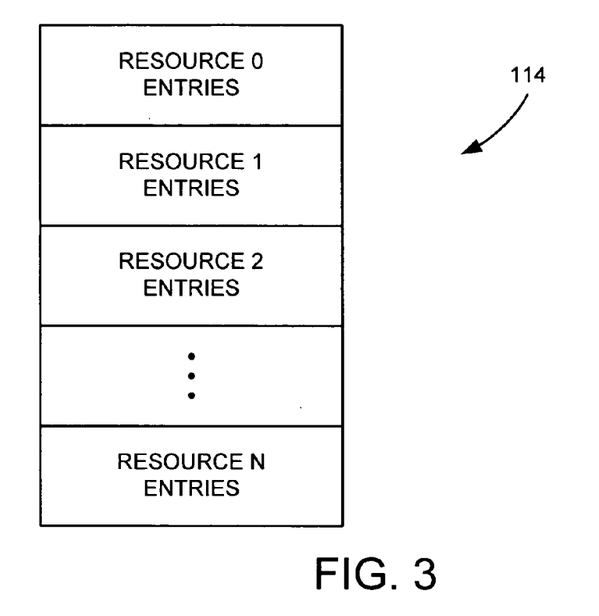
FIG. 3 provides a preferred arrangement for a resource index utilized by the software of FIG. 2 to identify various types of system resources available to carry out various tasks.

FIG. 3 represents a preferred arrangement for various types of system resources in a resource index 114. Because the formats and nomenclatures for the resources can vary widely depending upon the architecture of a given, for simplicity the resources will be generically referred to as Resource 0 through Resource N. Resource 0, for example, can represent a host command request (HCR) which is used to identify various variables, values or attributes associated with a given process, and so on.

FIG. 3 shows that there are associated, limited populations of each resource type; that is, at any given time there are only a fixed number of each type of system resource (e.g., there are only N=2,048 Resource 0s, or HCRs, available for use at any given time). It is also contemplated that each type of system resource will have its own number N of resources (e.g., there only N=1,024 Resource 1s available for use at any given time, etc.). Thus, if during the operation of the system 100 a greater number than N processes concurrently require allocation of a given resource, an ordered allocation approach is required, such as will now be discussed with respect to FIG. 4.

Figure 4:
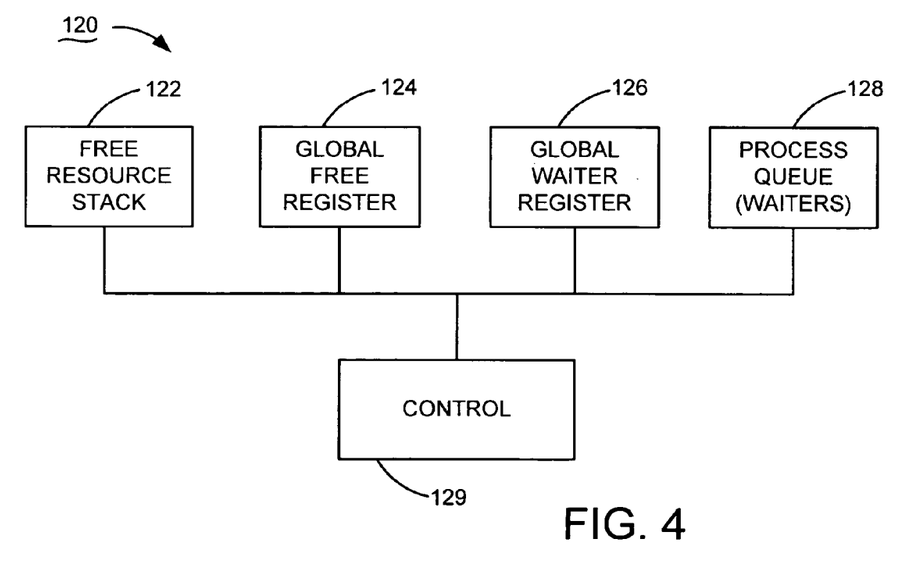
FIG. 4 is a functional block representation of a resource allocation module constructed and operated in accordance with preferred embodiments of the present invention to allocate available resources among various processes of the software of FIG. 2.

FIG. 4 provides a functional block diagram for a resource allocation module 120 constructed and operated in accordance with preferred embodiments of the present invention to allocate available resources for use by various processes of the software of FIG. 2. The resource allocation module 120 forms a portion of the software structure of the system 100, and is preferably embodied within the software utilized by the controllers 108 to handle processes invoked by at least some of the software layers of FIG. 2.

The module 120 includes a free resource stack 122, a global free register 124 also referred to as "gbl.free," a global waiter register 126 also referred to as "gbl.waiter," and a process queue 128 for waiters (i.e., pending software processes awaiting an available resource). A control block 129 facilitates interaction among these various elements. Other types of memory spaces apart from those shown in FIG. 4 can be utilized as desired.

Figure 5:
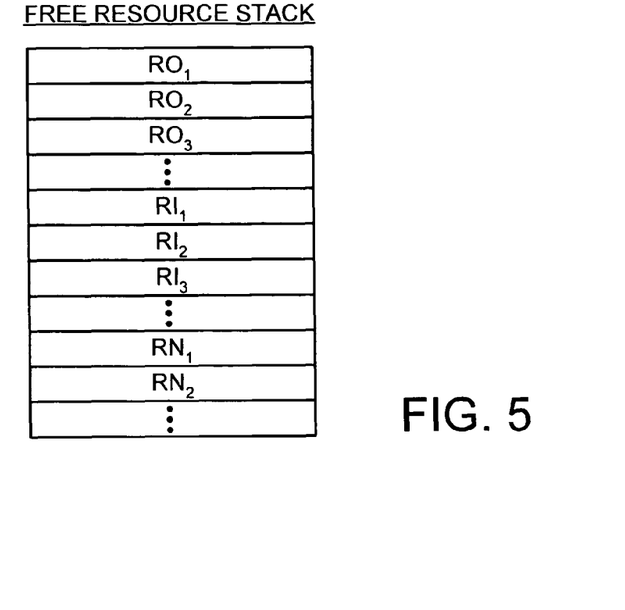
FIG. 5 depicts a preferred arrangement for the free resource stack from FIG. 4 which operates to identify those resources from FIG. 4 that are presently available (free) for use.

The free resource stack 122 is depicted in FIG. 5 to preferably comprise an index of available resources. While the format of the stack 122 can take any number of forms, preferably an indicator is provided within the stack when a particular resource from the various resources of FIG. 3 has been released and is now free for use by a subsequent process. Thus, the stack 122 provides a dynamic, up-to-date indication of overall resource availability on an individual resource basis.

Figures 6, 7:
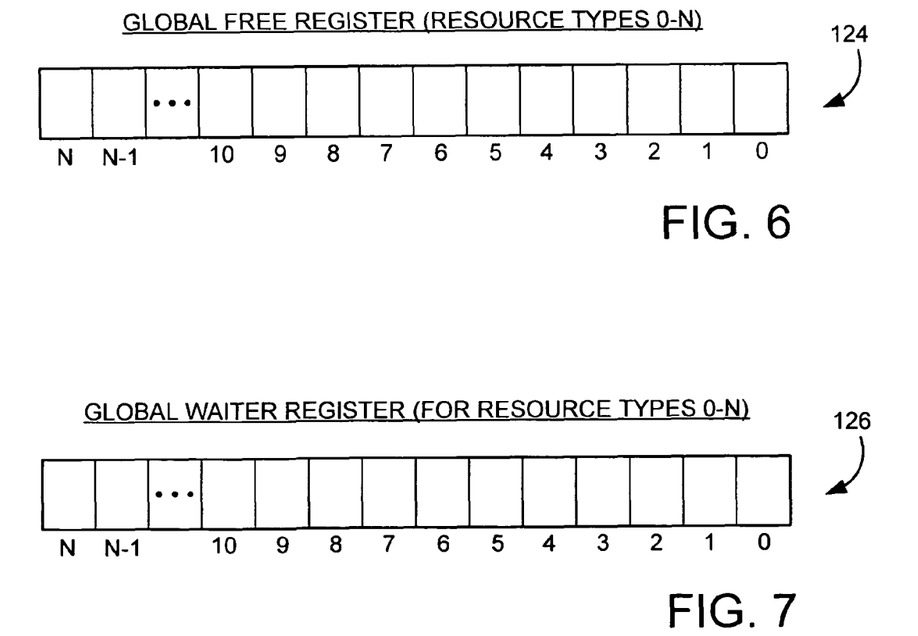
FIG. 6 represents a preferred arrangement for the global free register of FIG. 4 which indicates when one or more of each type of resource is available for use.
FIG. 7 represents a preferred arrangement for the global waiter register of FIG. 4 which indicates when one or more processes are waiting for an available resource.

FIG. 6 shows the gbl.free register 124 to preferably include a number of bits 0-N corresponding to the number of types of system resources from FIG. 3. As explained below, a logical bit value (such as 1) is set in the appropriate bit-field whenever at least one of that type of resource is available, as indicated by the stack 122. The remaining logical bit value (in this case 0) is correspondingly set in the appropriate bit-field whenever none of that type of resource is currently available.

FIG. 7 illustrates the gbl.waiter register 126 as preferably providing a corresponding set of bits 0-N. The logical bit values are used to denote the status of pending processes awaiting resources; for example, a logical bit value (such as 1) indicates that at least one process awaits the associated resource, while the other logical bit value (i.e., 0) indicates that no processes are currently awaiting that resource.

Figure 8:
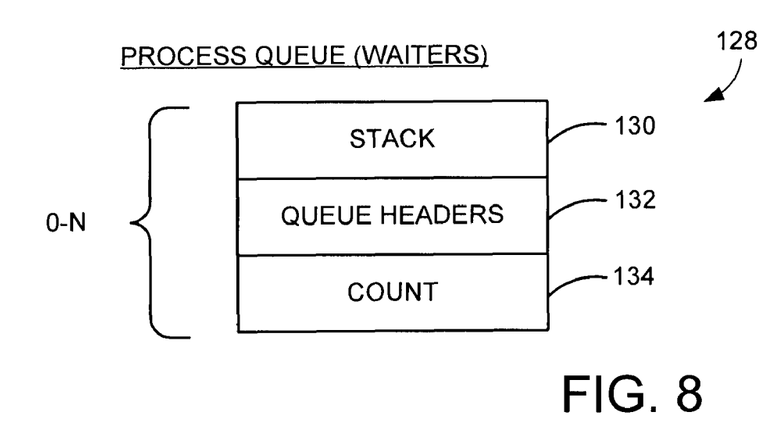
FIG. 8 provides a preferred arrangement for the process queue of FIG. 4 which stores information relating to processes awaiting resources (waiters).

The process queue 128 can take any number of suitable forms and is depicted in FIG. 8 to preferably include, for each of the resources 0-N in turn, a stack 130, a queue header field 132 and a count field 134. The queue 128 preferably tracks the queued processes to allow servicing in a first-in-first-out manner. The count field 134 allows the number of that type of resource required by the associated process to be identified (this number can be one or a value greater than one).

Figure 9:
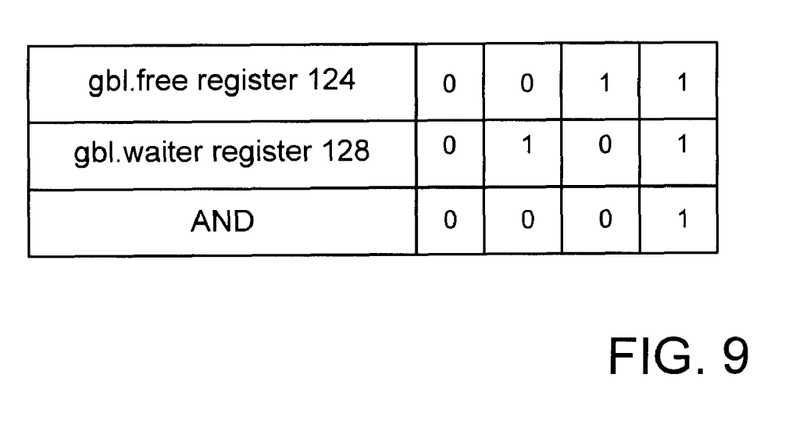
FIG. 9 presents a simplified logic table to illustrate a logical combination of values from the registers of FIGS. 7 and 8.

The gbl.free and gbl.waiter registers 124, 126 enable resource allocation matches to be identified through combinatorial operations upon the associated bit-placements of the registers, as depicted in FIG. 9. For example, if a logical 1 in the gbl.free register 124 indicates that one (or more) of a given type of resource is available, and a logical 1 in the gbl.waiter register 126 indicates that one (or more) of that type of resource is requested by a waiting process, then the result of an AND operation of these respective bits (i.e., 1*1=1) can be used to indicate that a match exists between a waiting process and a needed resource. The use of the AND operation is illustrative, not limiting; any number of other logical operations, comparisons or combinations can be readily carried out as desired.

Figure 10:
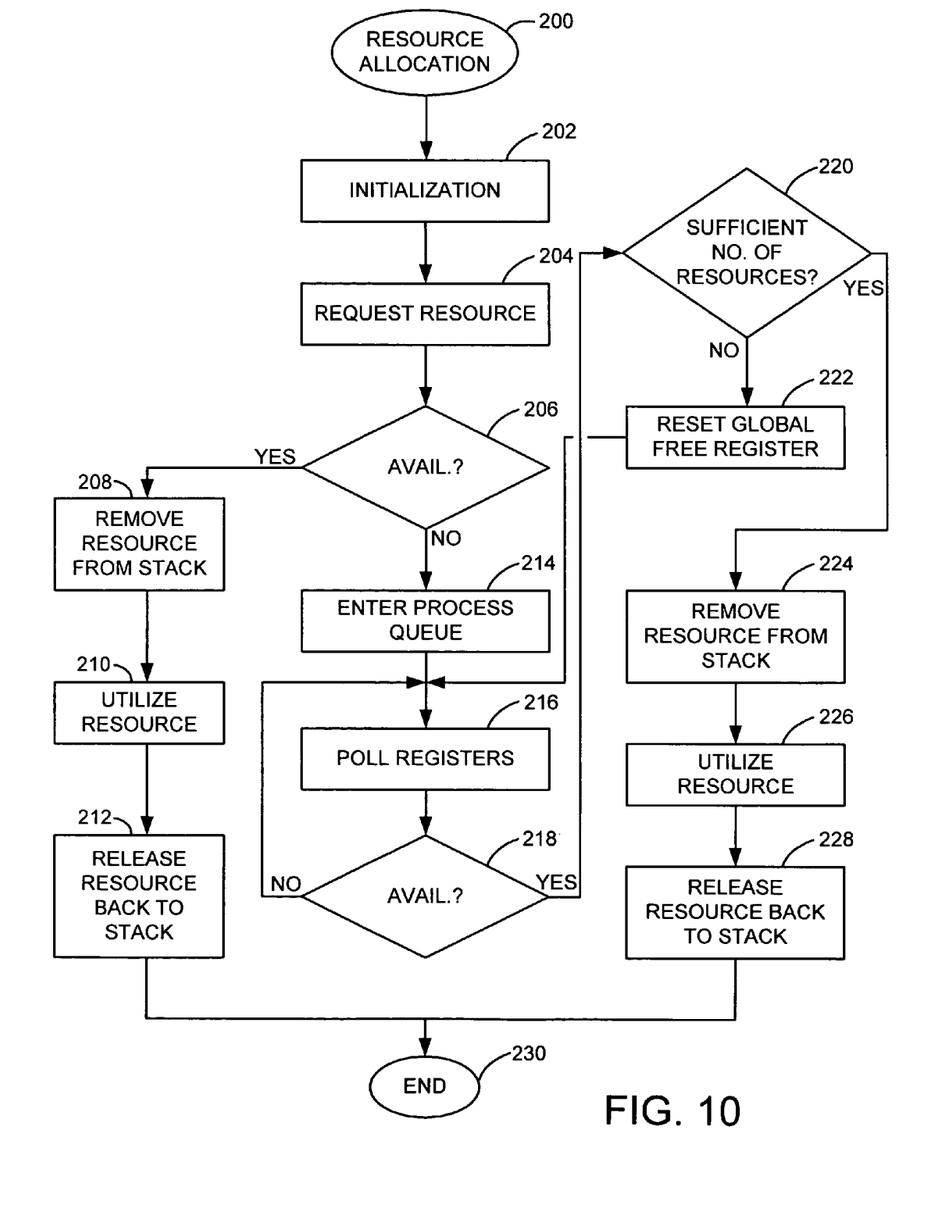
FIG. 10 is a flow chart for a RESOURCE ALLOCATION routine representative of steps carried out in accordance with preferred embodiments of the present invention.

A preferred manner in which the module 120 of FIG. 4 operates in accordance with preferred embodiments can be understood by a review of a RESOURCE ALLOCATION routine 200 presented in FIG. 10. The RESOURCE ALLOCATION routine 200 has been simplified in order to show the preferred tracking and handling for a particular process, but it will be understood that the routine concurrently evaluates multiple processes in like manner.

At INITIALIZATION step 202, an initialization operation is first performed to initialize the system 100. This step includes the loading of the resource index 114 of FIG. 3 to identify the addresses for the various system resources. The free resource stack 122 is initially loaded and the various bits in the registers 124, 126 are initially set.

Upon initialization, it is contemplated that some resources may be highly utilized from the very beginning of system operation, but for the most part the stack 122 and gbl.free register 124 will represent a relatively low initial overall resource utilization (i.e., a relatively large population of resources will be initially available for use). Contra wise, the gbl.waiter 126 will generally be populated largely, if not entirely, with logical 0s indicating that few or no pending processes are awaiting unavailable resources.

At some point during subsequent operation, a selected process will request a selected resource, as generally indicated by REQUEST RESOURCE step 204. Preferably, at this point a check is made by the control block 129 to determine if the requested resource is available using the stack 122, as indicated by decision AVAILABILITY step 206. If yes (the requested resource is available), the process flow will pass to REMOVE RESOURCE FROM STACK step 208 where the free resource stack 122 is updated to remove the identifier for the selected resource therefrom. This reflects the fact that this particular resource is now in use and not available for assignment to other processes.

The selected process will proceed to utilize the resource at UTILIZE RESOURCE step 210, and upon completion, the process will release the resource at RELEASE RESOURCE BACK TO STACK step 212. Preferably, the RELEASE RESOURCE BACK TO STACK step 212 includes an appropriate entry into the free resource stack 122 indicating that the released resource is now available.

On the other hand, if the requested resource is not available, the process flow will pass from decision AVAILABILITY step 206 to ENTER PROCESS QUEUE step 214 where the process enters the process queue 128 pending availability of the requested routine.

At POLL REGISTERS step 216, the registers 124, 126 are polled by the control block 129 to determine whether the requested resource is now available. The polling provided by POLL REGISTERS step 216 can be carried out a number of ways, but preferably this is an on-going operation whereby the respective bit-placement pairs in the respective registers 124, 126 are sequentially combined (preferably using an AND operation as set forth by FIG. 9). The control block 129 preferably begins with the bit 0 locations in the registers 124, 126 and combines these values, moves to the bit 1 locations and combines these values, and so on until a logical 1 is returned, after which further processing takes place as discussed below.

At this point it will be noted that after a logical 1 is returned and serviced, the control block 129 preferably resumes with combining the next bit-placements in line instead of starting over and beginning with bit 0. In this way, a more equitable distribution of the resource allocations is achieved. Once the control block 129 reaches bit N in the respective registers 124, 126, it returns and begins again through the sequence starting with bit 0.

As indicated by decision AVAILABILITY step 218, when a result of the polling of POLL REGISTERS step 216 indicates that a requested resource is available for a pending process, the routine of FIG. 10 continues to SUFFICIENT NUMBER OF RESOURCES step 220 where the control block 129 determines whether there is a sufficient number of the requested resource type to meet the needs of the waiting process.

Preferably, this includes a step of checking the value of the associated count field 134 (FIG. 9) and, if this value is greater than 1 (e.g., 4), the control block 129 further proceeds to scan the free resource stack 122 to determine of there are at least the required number of available resources to satisfy the pending process. If not, the associated bit placement in the gbl.free register 124 is preferably reset to logical 0, RESET GLOBAL FREE REGISTER step 222, and the routine passes back to the POLL REGISTERS step 216 as shown.

When the number of the requested type of resource is sufficient to satisfy the pending process, the routine passes from SUFFICIENT NUMBER OF RESOURCES step 220 to REMOVE RESOURCE FROM STACK step 224 where the resource indicator for each allocated resource is removed from the stack 122. The process proceeds to utilize the resource at UTILIZE RESOURCE step 226 and, upon completion, releases the resource back to the stack 122 at RELEASE RESOURCE BACK TO STACK step 228. At this point the routine is shown to end at END step 230 for the selected process, although it will be understood that the foregoing steps continue to be carried out as each waiting process is identified in turn.

It is contemplated that in many cases each software process will require the utilization of only a single type of resource (i.e., Resource 0), but the foregoing routine can also be used in cases where a given process requires two or more different types of resources (i.e., Resource 0 and Resource 1). One way in which this can be carried out is by making duplicate entries of the pending process in the process queue for each required resource, proceeding to allocate (without using) each available resource type once it becomes available, and then proceeding with the process once all of the different types of resources have been released.

An advantage of the foregoing various embodiments includes the ability to quickly evaluate the full range of available resources and pending processes through a simple combinatorial logic step upon the registers 124, 126 without the need to directly access the stack 122 or the queue 128. A first in, first out (FIFO) approach is preferably utilized so that when multiple processes are waiting for a given resource, the oldest pending process in the queue will be serviced first. This helps to reduce timeout errors and further equalize allocations. Alternatively, priorities can be assigned to different types of processes, in which case the structure of the queue 128 can be modified (such as by sorting) so that higher priority processes are serviced earlier in the queue once a match is determined.

It will be noted that while the foregoing embodiments have been generally directed to a distributed processing system with multiple data storage arrays, such is not necessarily limiting to the scope of the claimed invention. Rather, any number of different types of systems, including but not limited to consumer products, hand held entertainment and gaming devices, instrumentation devices such as global positioning system (GPS) modules, home computers, mobile communication devices, etc. can readily incorporate the claimed invention.

As embodied herein and as claimed below, the present invention is generally directed to a method and an apparatus for allocating system resources for use by software processes in a computer-based system (such as 100), such as but not limited to a wide area network (WAN) comprising a data storage array (such as 104).

In accordance with some preferred embodiments, the method preferably comprises steps of providing a first bit indicator (such as 124) to indicate whether at least one system resource is available for use, providing a second bit indicator (such as 126) to indicate whether a pending software process awaits availability of said system resource in order to carry out said process, and proceeding to allocate said system resource for use by said process in relation to a combination of the first and second bit indicators (such as by step 216).

In accordance with further preferred embodiments, the apparatus preferably comprises a first memory space (such as 124) which stores a first bit indicator which indicates whether at least one system resource is available for use, a second memory space (such as 126) which stores a second bit indicator which indicates whether a pending software process awaits availability of said system resource in order to carry out said process, and a control block (such as 129) which allocates said system resource for use by said process in relation to a combination of the first and second bit indicators.

For purposes of the appended claims, the recited first means will be understood to correspond to the disclosed module 120 of FIG. 4. Moreover, reference in the appended claims to a "bit indicator" will be understood to a value comprising at least one bit.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage array, it will be appreciated by those skilled in the art that the claimed subject matter is not so limited and various other processing systems can be utilized without departing from the spirit and scope of the claimed invention.

What is claimed is:

1. A method comprising steps of storing a first bit indicator in a first memory with a magnitude that indicates at least one of a selected type of system resource is available for use, storing a second bit indicator in a second memory with a magnitude that indicates a pending software process awaits availability of the selected type of system resource in order to carry out the process, logically combining the first and second bit indicators using a Boolean function to generate a third bit indicator, and allocating the available selected type of system resource for use by the process responsive to a magnitude of the third bit indicator, the magnitude of the first bit indicator being the same responsive to a single one of the selected type of system resource being available for use and responsive to multiple ones of the selected type of system resource being available for use, the magnitude of the second bit indicator being the same responsive to a single pending software process awaiting availability of the selected type of system resource and responsive to multiple pending software processes awaiting availability of the selected type of system resource.

2. The method of claim 1, wherein the system resource of the storing a first bit indicator step is a first system resource, wherein the method further comprises a step of providing a free resource stack which identifies each of a population of different types of system resources available for use, and wherein the allocating step comprises removing the first system resource from the free resource stack during the use by the software process.

3. The method of claim 1, wherein the storing a first bit indicator step comprises employing a multi-bit register comprising a plurality of bit storage locations each of which corresponds to a selected one of the different types of system resources available for use, and wherein the first bit indicator comprises a bit stored in a selected bit storage location of the register.

4. The method of claim 1, further comprising a step of providing a process queue which stores information associated with the process, wherein the second bit indicator is set in relation to entry of the information into the queue.

5. The method of claim 1, wherein the first bit indicator is characterized as a single bit value, the second bit indicator is characterized as a single bit value, and the allocation takes place responsive to the first bit indicator being equal to the second bit indicator.

6. The method of claim 1, wherein the first bit indicator comprises a single bit in a first multi-bit register, the second bit indicator comprises a single bit in a second multi-bit register, and the third bit indicator comprises a single bit.

7. The method of claim 6, wherein each register has a plurality of bit storage locations corresponding to a total number of different system resources.

8. The method of claim 7, wherein corresponding bit-placements in the bit storage locations of the respective registers are sequentially compared during the allocation step to generate a sequence of third bit indicators, wherein the allocation takes place when a selected third bit indicator in the sequence has a magnitude equal to a predetermined value.

9. The method of claim 7, wherein the at least one system resource and the pending software process form a portion of a computer-based system comprising a data storage array.

10. An apparatus, comprising:
   a first memory space which stores a first bit indicator having a first magnitude which indicates at least one of a selected type of system resource is available for use, said first magnitude being the same responsive to a single one of the selected type of system resource being available for use and responsive to multiple ones of the selected type of system resource being available for use;
   a second memory space which stores a second bit indicator having a second magnitude which indicates a pending software process awaits availability of the system resource in order to carry out the process, said second magnitude being the same responsive to a single pending software process awaiting availability of the selected type of system resource and responsive to multiple pending software processes awaiting availability of the selected type of system resource; and
   a control block which generates a third bit indicator as a result of a Boolean combinatorial logic operation upon the first and second bit indicators and allocates the system resource for use by the process responsive to a magnitude of the third bit indicator.

11. The apparatus of claim 10, further comprising a free resource stack formed in a third memory space which identifies each of a population of different types of system resources available for use, wherein the first bit indicator is set in relation to entry of the resource into the stack.

12. The apparatus of claim 10, wherein at least a selected one of the first and second memory spaces comprises a multi-bit register comprising a plurality of bits, and wherein the first bit indicator comprises one of the plurality of bits.

13. The apparatus of claim 12, wherein a remaining one of the first and second memory spaces comprises a second multi-bit register, wherein the second bit indicator comprises one of the plurality of bits of the second multi-bit register, and wherein the control block operates to sequentially combine the respective bits from the registers.

14. The apparatus of claim 10, further comprising a process queue in a fourth memory space which stores information associated with the process, wherein the second bit indicator is set in relation to entry of the information into the queue.

15. The apparatus of claim 10, wherein the first bit indicator is characterized as a single bit value, the second bit indicator is characterized as a single bit value, and the allocation takes place responsive to the first bit indicator being equal to the second bit indicator.

16. The apparatus of claim 10, wherein the control block further determines whether the process requires a plurality of system resources and if so, further identifies whether the plurality of system resources are available prior to allocating the resource.

17. The apparatus of claim 10, wherein the first bit indicator, the second bit indicator, and the third bit indicator are each a single bit.

18. The apparatus of claim 10 characterized as a computer-based system comprising a data storage array.

19. A method comprising executing a Boolean combinatorial logical operation which combines a first bit indicator associated with an available resource with a second bit indicator associated with a pending software process to form a third bit indicator, and allocating the resource for use by the process responsive to a magnitude of the third bit indicator, the first bit indicator having a common magnitude responsive to a single one of said resource being available and multiple ones of said resource being available, the second bit indicator having a common magnitude responsive to a single pending software process awaiting the available resource and multiple pending software processes awaiting the available resource.

20. The method of claim 19, wherein the first bit indicator is a first bit stored in a first register indicative of an availability status of the system resource, and wherein the second bit indicator is a second bit stored in a different second register indicative of a need of the pending software process for the resource.

21. The method of claim 20, wherein the Boolean combinatorial logical operation comprises a two-input logical AND operation of the first bit indicator and the second bit operator, and the third bit indicator is a result of the AND operation.

22. The method of claim 1, wherein the second bit indicator does not identify the particular software process awaiting availability of the system resource.

* * * * *